(12) United States Patent
Addington et al.

(10) Patent No.: US 6,405,239 B1
(45) Date of Patent: Jun. 11, 2002

(54) USING A HIERARCHICAL FILE SYSTEM FOR INDEXING DATA BROADCAST TO A CLIENT FROM A NETWORK OF SERVERS

(75) Inventors: Timothy H. Addington, Roswell; Darryl L. Defreese, Lawrenceville, both of GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 0 days.

(21) Appl. No.: 09/319,844

(22) PCT Filed: Dec. 9, 1997

(86) PCT No.: PCT/US97/22535
§ 371 (c)(1),
(2), (4) Date: Jun. 9, 1999

(87) PCT Pub. No.: WO98/26528
PCT Pub. Date: Jun. 18, 1998

Related U.S. Application Data (60) Provisional application No. 60/032,626, filed on Dec. 9, 1996, and provisional application No. 60/035,299, filed on Jan. 10, 1997.

(51) Int. Cl.$^7$ .............................................. G06F 15/16

(52) U.S. Cl. ........................ 709/203; 709/238; 707/10

(58) Field of Search ................................. 709/203, 217, 709/218, 219, 238; 725/114, 91, 93, 87, 116; 707/10

(56) References Cited

U.S. PATENT DOCUMENTS

| | | | | |
|---|---|---|---|---|
| 5,404,505 A | * | 4/1995 | Levinson ...................... | 707/10 |
| 5,581,704 A | * | 12/1996 | Barbara et al. .............. | 711/141 |
| 5,614,940 A | | 3/1997 | Cobbley et al. | |
| 5,706,435 A | * | 1/1998 | Barbara et al. .............. | 711/141 |
| 6,002,852 A | * | 12/1999 | Birwell et al. ............... | 709/203 |
| 6,041,359 A | * | 3/2000 | Birdwell ...................... | 709/238 |

OTHER PUBLICATIONS

Delis, A. et al., Management of Updates in the Enhanced Client Server DBMS, Distributed Computing Systems, 1994 International Conference, IEEE, pp. 326–334, especially p. 328, col. 1–2.

Welch, B. et al., Prefix Tables: A simple Mechanism for Locating Files in a Distributed System, Distributed Computing Systems, $6^{th}$ Conference, May 1986, pp. 184–189, especially p. 186, col. 2 and p. 187, col. 1.

* cited by examiner

*Primary Examiner*—Glenton B. Burgess
*Assistant Examiner*—Kimberly Flynn
(74) *Attorney, Agent, or Firm*—Kenneth M. Massaroni; Kelly A. Gardner; Hubert J. Barnhardt, III (57) ABSTRACT

A broadcast file system organizes data sent to a client by broadcast via a high capacity data broadcast delivery network from a plurality of servers. The data is organized into a hierarchical file system including a directory index. A server registers to send data via the broadcast file system of the present invention and is assigned a respective directory. The server may create, modify, or delete a subdirectory or a file under the respective directory of that server. The directory index is periodically broadcast. The client caches this directory index and presents the directory index to a client application. The client application may request a portion of data from the directory index. The data available from the plurality of servers is periodically broadcast to the client, and the client filters out the requested portion of data to be provided to the client application. In this manner, broadcast data available from a plurality of server appears to a client application as a hierarchical file system having a directory index similar to that of a computer operating system. Moreover, the client application may request specified data not within the directory index via a two-way communications network. If this data is found, this specified data may be sent to the client via the two-way communication network or via the broadcast delivery network. In addition, the broadcast file system of the present invention may be used for broadcasting data from a database with the directory index organized according to a database schema.

10 Claims, 9 Drawing Sheets

USING A HIERARCHICAL FILE SYSTEM FOR INDEXING DATA BROADCAST TO A CLIENT FROM A NETWORK OF SERVERS

RELATED APPLICATIONS

This application claims priority from provisional patent application Serial No. 60/035,299, filed on Jan. 10, 1997, entitled "Broadcast File System" and Application Serial No. 60/032,626, filed on Dec. 9, 1996, entitled "Explorer Administrative Console". The disclosures of each of these provisional patent applications is incorporated herein by reference.

TECHNICAL FIELD

This invention relates to data communications systems, and more particularly, to a data broadcast system which uses a hierarchical file system for organizing data broadcast from a network of servers to a client.

BACKGROUND OF THE INVENTION

Figure 1:
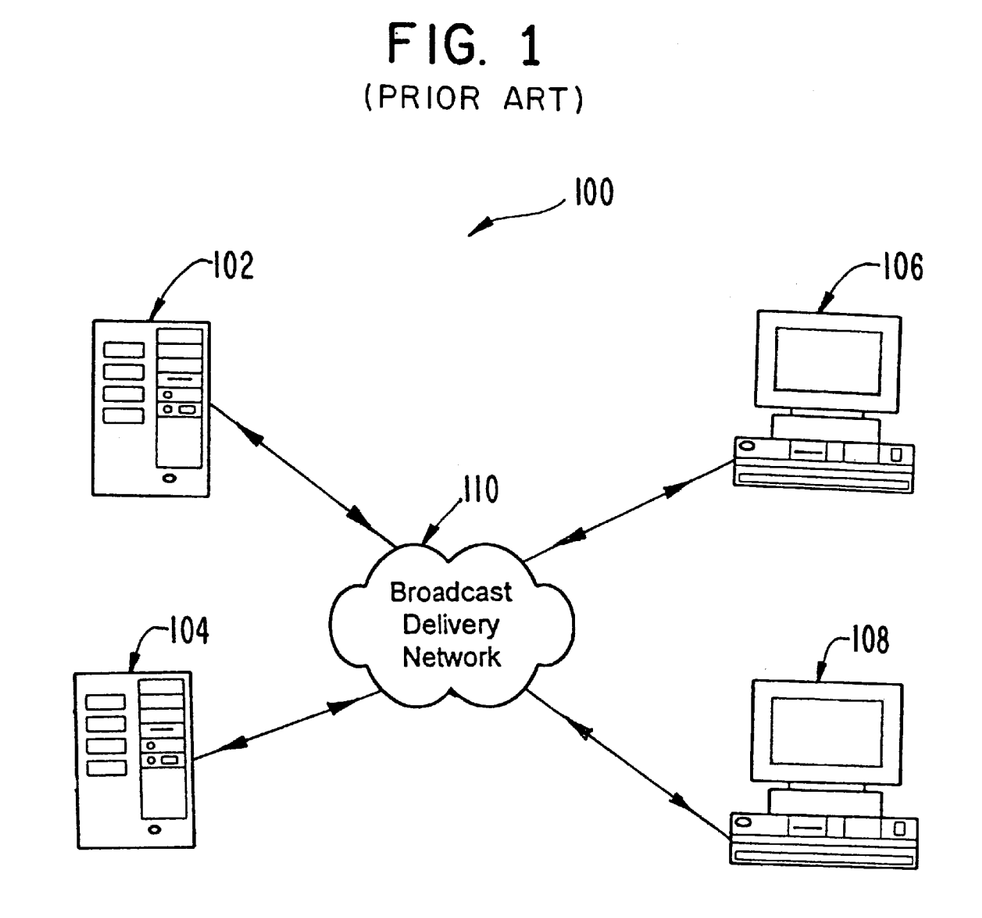
FIG. 1 shows a prior art broadcast data communications system.

Referring to FIG. 1, a broadcast data communications system 100 includes a network of servers and clients. A first server 102 and a second server 104 are coupled to a first client 106 and a second client 108 via a broadcast delivery network 110.

Data is sent via broadcast from the servers 102 and 104 to the clients 106 and 108 on the one-way data delivery network 110 instead of via a two-way communications path, for the higher data capacity of a broadcast data delivery network. A two way communications path such as a telephone connection typically has data capacity of approximately 34 kilobits/second. A broadcast data network such as broadcast television, satellite, or cable television, on the other hand typically has data capacity of as high as 40 megabytes/second. Thus, the data capacity of a broadcast data network is 1200 times more than the data capacity of a two-way telephone connection.

In the prior art broadcast data communications system 100 of FIG. 1, respective data sent from a server to a client may be indexed independently by each server to inform the client of the respective data content. A client which receives data from a plurality of servers sorts through the respective data from each server to determine the data of interest to that client.

A server may include a respective index that is independent of the index of other servers or a server may not include any index. In addition, an index sent by a server in the prior art broadcast data communications system 100 may include only a simple linear index of the data content sent by that server. In any case, the client may be required to perform extensive data processing in determining the type and organization of data sent by each server in the prior art broadcast data communications system 100.

SUMMARY OF THE INVENTION

Accordingly, a primary object of the present invention is to provide a more sophisticated data indexing system for data broadcast from a plurality of servers in order to minimize data processing burdens on a client receiving such broadcast data. More particularly, a broadcast file system of the present invention organizes data from the plurality of servers into a hierarchical file system including a directory index.

In a general aspect of the present invention, a broadcast file system for delivering data from a plurality of servers to a client includes a broadcast delivery network coupled to the client for broadcasting the data to the client. Additionally, a broadcast file system server, coupled to the broadcast data network and the plurality of application servers, organizes the data available from the servers into a hierarchical file system having a directory index. Each of the plurality of servers registers with the broadcast file system server to send respective data under a respective directory within the directory index. A server access network couples the plurality of servers to the broadcast file system server.

The broadcast file system periodically broadcasts the directory index to the client via the broadcast delivery network. The client caches and provides this directory index to a client application. In this manner, the data available from the plurality of servers appears to the client application as a hierarchical file system of a computer operating system. Furthermore, the broadcast file system server periodically broadcasts the data available from the servers to the client via the broadcast delivery network such that the portion of the data requested by the client application from the directory index is available to the client application.

In another aspect of the present invention, the client requests specified data not available from the directory index via a two-way communications network. If the specified data is available from any of the plurality of servers, this specified data is sent to the client either via the two-way communications network or via the broadcast delivery network.

In a further aspect of the present invention, a database server coupled to the broadcast deliver network maintains a database. The respective data available from the database server includes tables from the database. The respective directory of the database server within the directory index organizes the tables according to a database schema. A client application specifies database schema parameters from the directory index when accessing data available from the database server.

These and other features and advantages of the present invention will be better understood by considering the following detailed description of the invention which is presented with the attached drawings.

BRIEF DESCRIPTION OF THE DRAWINGS

Elements having the same reference numeral in FIGS. 1–9 refer to the same element.

DETAILED DESCRIPTION

Figure 2:
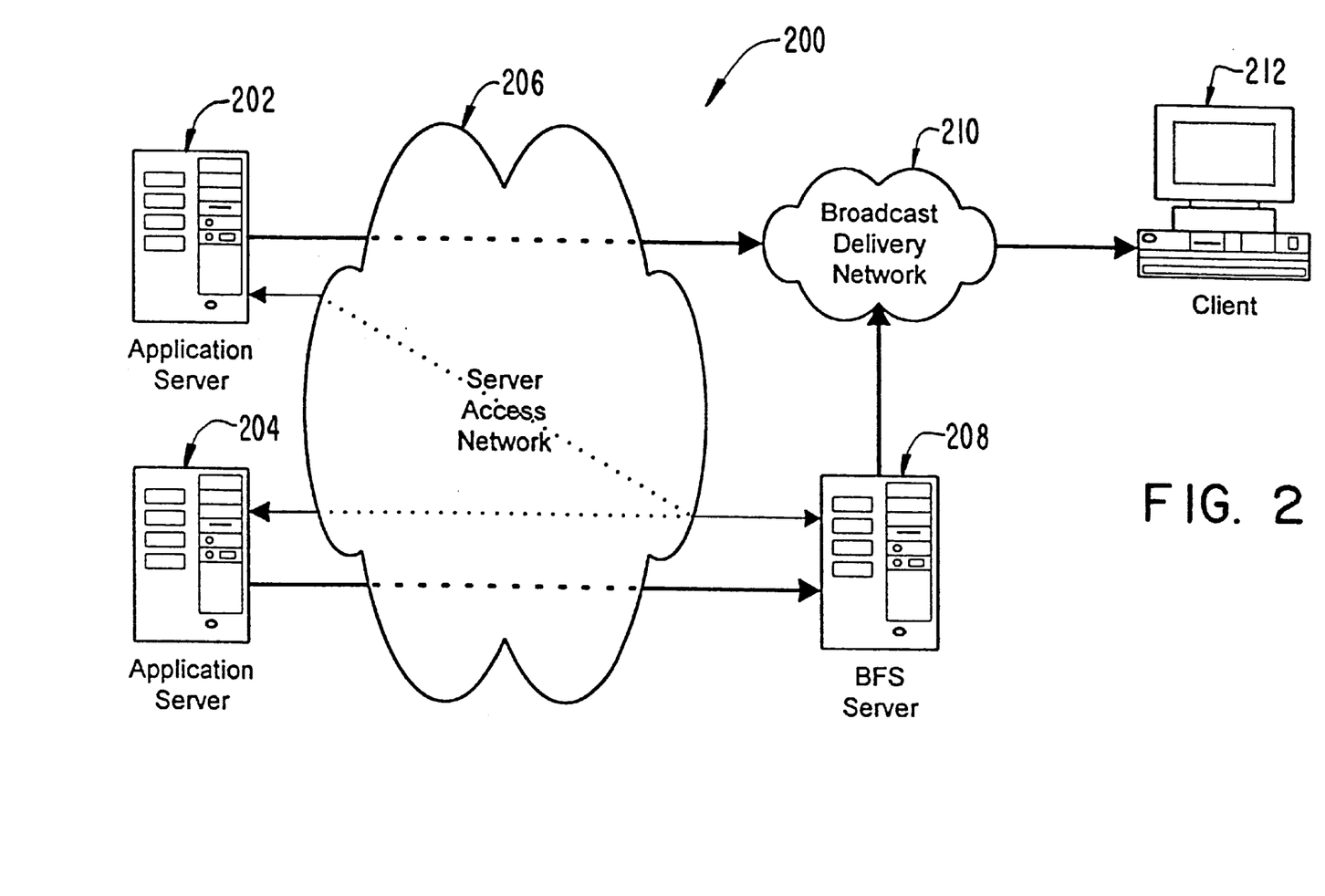
FIG. 2 shows a one-way broadcast file system for communication of data to a client from a plurality of servers, according to a preferred embodiment of the present invention.

Referring to FIG. 2, a one-way broadcast file system 200 according to a preferred embodiment of the present invention includes a plurality of servers including a first server 202 and a second server 204 coupled to a server access network 206. This server access network 206 couples the plurality of servers 202 and 204 to a BFS (Broadcast File System) server 208 and to a broadcast delivery network 210. The BFS server 208 is also coupled to the broadcast delivery network 210. The broadcast delivery network 210 transports data available from the plurality of servers to a client 212.

Figure 3:
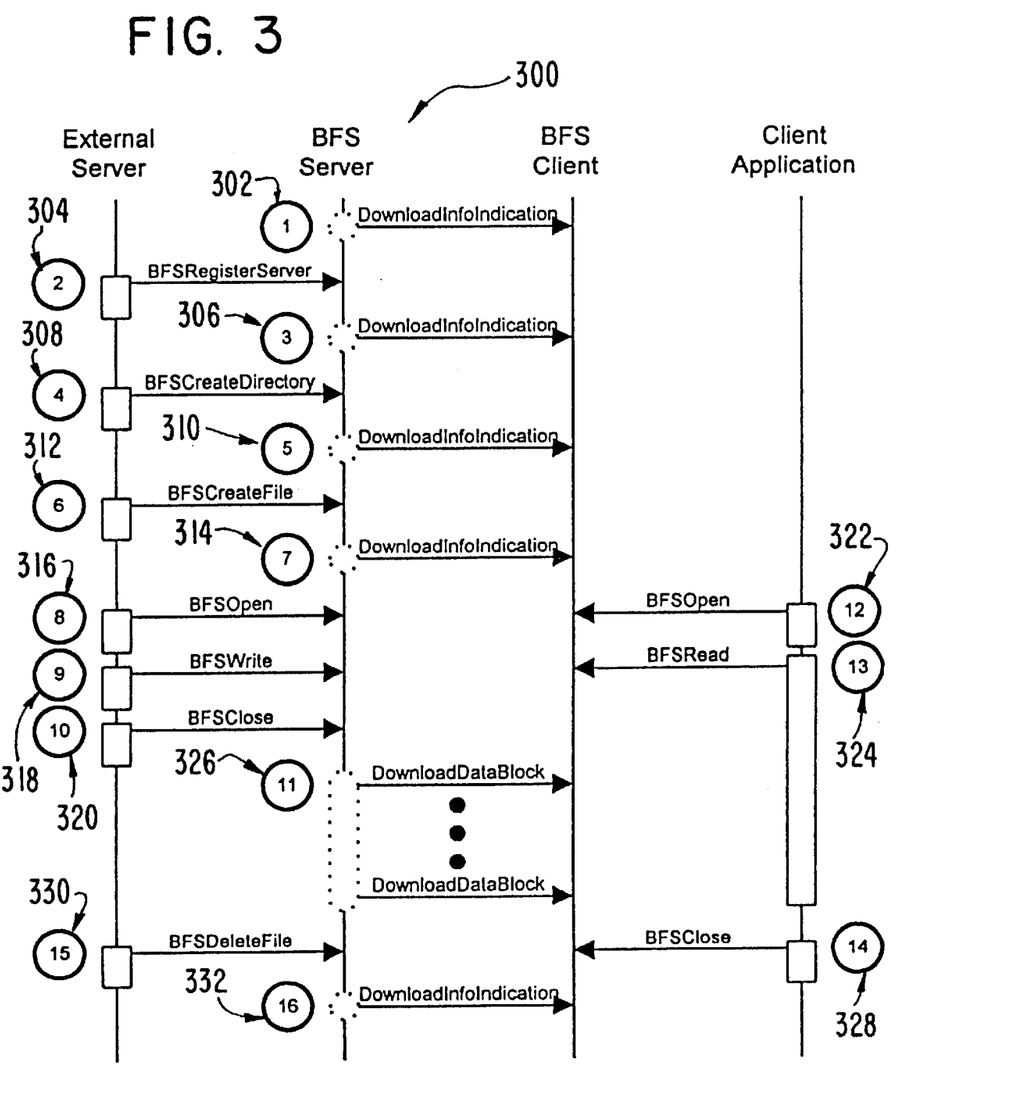
FIG. 3 shows an example time-line of operation of the one-way broadcast file system of FIG. 2, according to a preferred embodiment of the present invention.

The operation of the one-way broadcast file system 200 is described with an example operation time-line 300 of FIG. 3. At step 302, the BFS server 208 downloads directory index to the client 212 via the broadcast delivery network 210. This directory index may include channel information indicating where particular data may be transported when the broadcast delivery network 210 includes multiple channels.

When a server wishes to broadcast data via the broadcast delivery network 210, the server initially registers with the BFS server 208 at step 304. The BFS server 208 then creates a hierarchical file system with all respective data available from each server that is registered with the BFS server 208.

The BFS server 208 starts with a home directory such as "\BFS\", and each server that has registered with the BFS server 208 is assigned a respective directory in this hierarchical file system. For example, if the first server 202 and the second server 204 register with the BFS server 208, then, a first directory "\BFS\first_server\" under the home directory "\BFS\" may be created for the first server 202, and a second directory "\BFS\second_server\" under the home directory "\BFS\" may be created for the second server 204.

The BFS server 208 periodically downloads directory index at step 306 from step 302 and by now includes information that directories "\BFS\first_server\" and "\BFS\second_server\" have been added. The first server 202 and the second server 204 may create subdirectories and files under their respective directories. Each server may create and maintain their respective hierarchical file system under their respective directories "\BFS\first_server\" and "\BFS\second_server\". For example, the first server may create a subdirectory "\BFS\first_server\first_subdirectory\" at step 308. Again, the BFS server 208 periodically downloads directory index at step 310 from step 306 and by now includes information that the first server 202 has created subdirectory "\BFS\first_server\first_subdirectory\".

Additionally, a server may create and maintain a file under the respective directory for that server. For example, the first server 202 may create a file under the respective directory "\BFS\first_server\first_file" or under a subdirectory "\BFS\first_server\first_subdirectory\first_file" at step 312. Again, the BFS server 208 periodically downloads directory index at step 314 from step 310 and by now includes information that the first server 202 has created files "\BFS\first_server\first_file" or "\BFS\first_server\first_subdirectory\first_file".

The BFS server 208 creates a directory index of all data available from the plurality of servers wishing to broadcast such data to the client 212 via the broadcast delivery network 210. Each server adds any data to be broadcast to the client under a respective directory assigned to that server by the BFS server 208. This directory index is periodically broadcast to the client via the broadcast delivery network 210 by the BFS server 208 to inform the client of data that is available from the plurality of servers.

The directory index is updated as new servers register with the BFS server 208, as old servers deregister with the BFS server 208, and as each server modifies the contents under its respective directory. For example, when a server no longer wishes to broadcast any data via the broadcast delivery network 210, that server may deregister with the BFS server 208 to remove the respective directory for that server from the directory index. The directory index is broadcast periodically and informs the client of such updates.

The client 212 caches this broadcast directory index upon receipt from the broadcast delivery network, and presents the directory index as a hierarchical file system to a client application (which is any application module that needs any portion of data available from the plurality of servers). In this manner, in the view of the client application, the data available from the plurality of servers 202 and 204 appears to the client application as a hierarchical file system of a computer operating system.

A server may also edit the contents of any files under the respective directory of that server. In FIG. 3, a server such as the first server 202 sends an file open indication at step 316, a file write indication at step 318, and a file close indication at step 320 to edit the content of a file.

Upon viewing the directory index broadcast from the BFS server 208, the client application may choose to open a file within the directory index. The client application sends to the client 212 a file open indication at step 322 and a file read indication at step 324 which requests data within a specified file within the directory index. The data content of the directory index is periodically broadcast via the broadcast delivery network 210 by the BFS server 208 (or directly by a server via the server access network 206) at step 326.

The client 212 filters out the specified data requested by the client application from this periodically broadcast data and provides the specified data to the client application. The client application receives the specified data provided by the client, and then sends a file close indication to the client 212 at step 328. (Note that the client application is an application module that requests a specified data from the client 212 and may be part of the client 212 or may be part of a data processor separate from the client 212.)

Broadcasting the data periodically at step 326 ensures that the client 212 will receive substantially all the data. If the client 212 misses some data in a first broadcast, the client 212 may receive that missed data in the subsequent broadcasts. The underlying mechanism for thus periodically broadcasting the data via the broadcast delivery network may be a broadcast data carousel mechanism which is defined in the MPEG-2 DSM-CC specification (ISC/IEC 13818-6 IS).

The servers 202 and 204 may, in addition to creating and modifying subdirectories and files under the respective directory assigned by the BFS server 208, delete subdirectories and files. For example, after a file has been broadcast, that file may become uncurrent, and in that case, a server may delete that file as indicated in step 330 of FIG. 3. Once again, the BFS server 208 periodically downloads directory index to the client 212 at step 332 and by now includes information that a file has been deleted (i.e., the deleted file is no longer included in the directory index broadcast during the download of directory index at step 332).

In this manner, the one-way broadcast file system 200 of the present invention presents any data available from the plurality of servers as a hierarchical file system of a computer operating system to any client application receiving the data from the plurality of servers. The BFS server 208 organizes data available from the plurality of servers into such a hierarchical file system including a directory index corresponding to that hierarchical system. That directory index is periodically broadcast to the client receiving broadcast data available from the plurality of servers. The client caches this directory index and presents this directory index to any client application which may need any portion of data available from the plurality of servers. The client application may select a file from the directory index, and the client gathers the data of that file from a periodic broadcast of the data available from the plurality of servers.

The client application which consumes a portion of the data broadcast from a plurality of servers has minimized processing burdens since the client application does not organize the data received from the broadcast delivery network 210. The data is already organized into a hierarchical file system before the data is presented to the client application. The data appears to be from a computer operating system from the perspective of the client application.

Moreover, the directory index is cached, and the underlying data broadcast via the broadcast delivery network 210 is not cached until the client application requests a portion of that data from the directory index. All of the broadcast data is not cached, and nemory resource is conserved with caching the portion of data that a client application requests.

In the one-way broadcast file system 200 of FIG. 2, the data flow is one directional from the plurality of servers 202 and 204 and the BFS server 208 to the client 212. The client application via the client 212 may request only data being available as indicated in the directory index composed by the BFS server 208.

Figure 4:
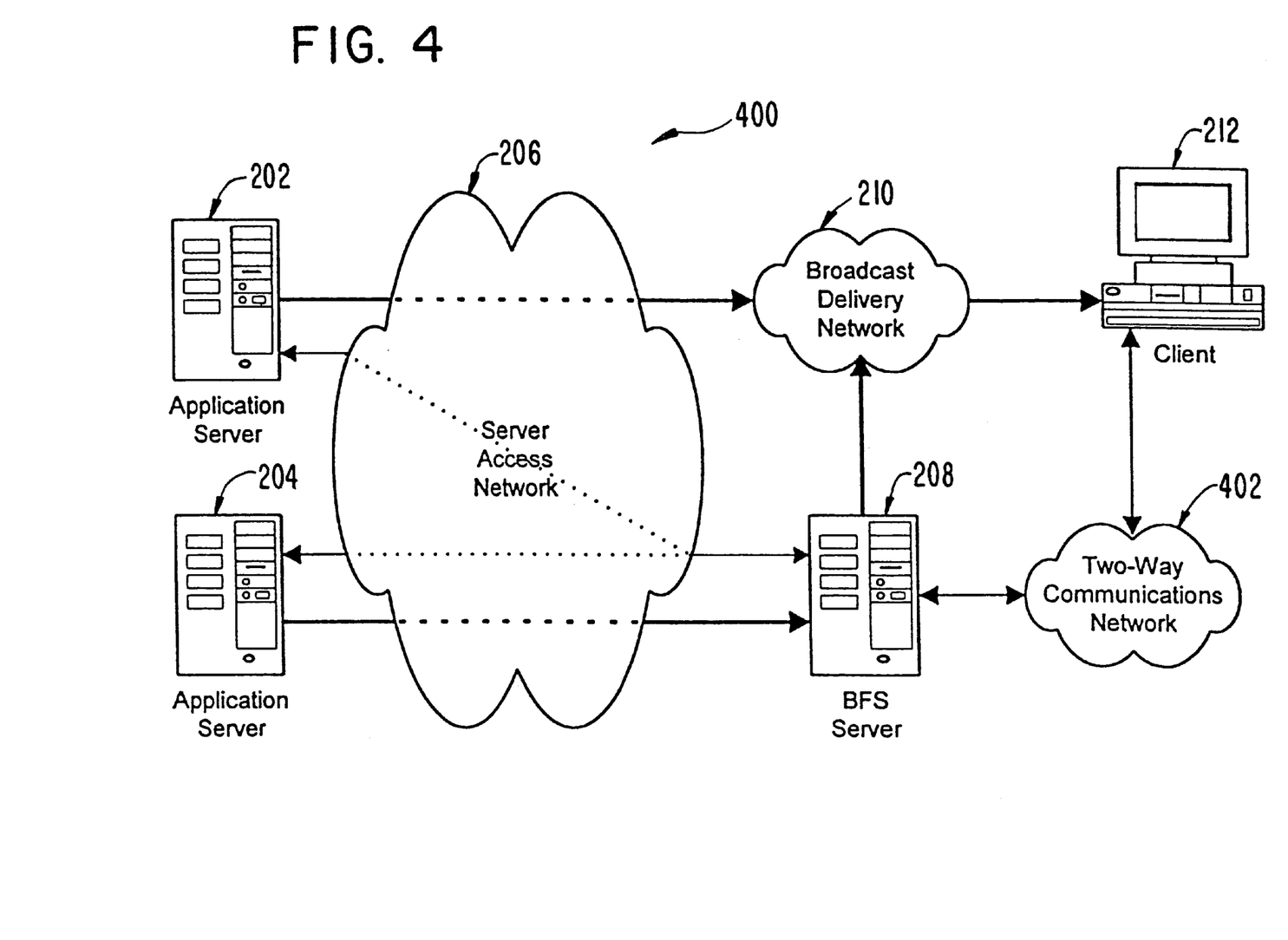
FIG. 4 shows a two-way broadcast file system for communication of data to a client from a plurality of servers, according to a preferred embodiment of the present invention.

In another embodiment of the present invention, a two-way broadcast file system 400 of FIG. 4 further includes a two-way communications network 402 coupled between the client 212 and the BFS server 208. Elements having the same reference numeral in FIGS. 2 and 4 refer to the same element. With the two-way communications network 402, the broadcast file system 400 becomes two-way with the client 212 being able to request specified data not available from the directory index composed by the BFS server 208.

Figure 5:
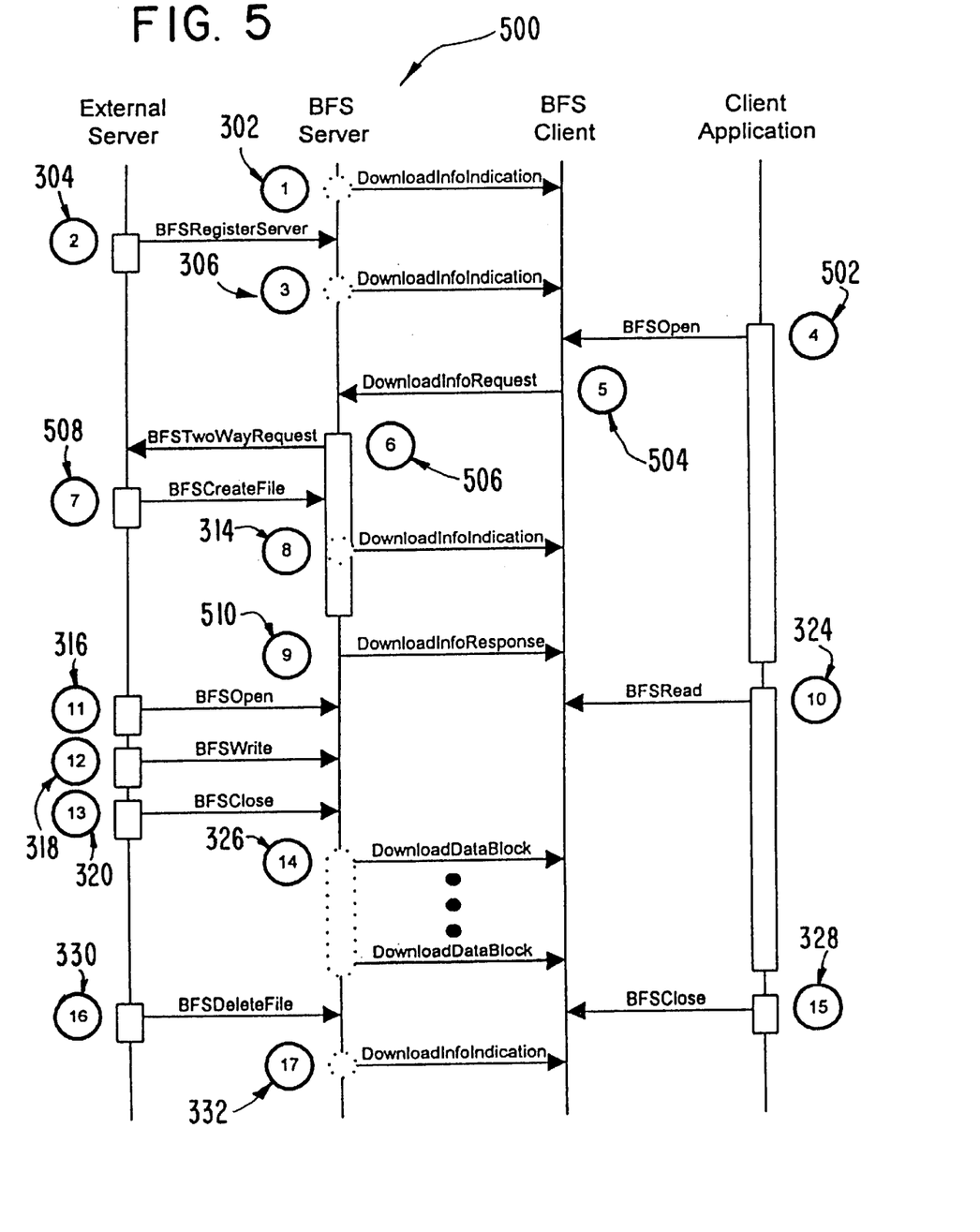
FIG. 5 shows an example time-line of operation of the two-way broadcast file system of FIG. 4, according to a preferred embodiment of the present invention.

The operation of the two-way broadcast file system 400 is described with an example operation time-line 500 of FIG. 5. Steps having the same reference numeral in FIG. 5 as in FIG. 3 refer to similar steps as described above for FIG. 3. However, the operation of the two-way broadcast file system 400 of FIG. 4 further includes the client application requesting to open a specified file containing specified data not available from the periodically broadcast directory index (at step 502).

The client 212 downloads this information request to the BFS server 208 via the two-way communications network 402 (at step 504). Upon receipt of this information request, the BFS server 208 queries the registered servers 202 and 204 to determine if any of the registered servers is able to provide the specified data requested by the client 212 (at step 506). A server may respond via the server access network 206 that the specified data may be available from that server and may add the requested file under the respective directory of that server (at step 508). The BFS server 208 downloads an information response that the specified file is available via the two-way communications network 402 (at step 510).

This specified file may then be sent to the client 212 by the BFS server via the two-way communications network 402 in the case that the particular client requesting this file is the only client that is interested in receiving this file. Alternatively, the specified file may be incorporated into the directory index composed by the BFS server and may be broadcast to all clients coupled to the broadcast delivery network 210. The latter mechanism is more desirable for files that may be of interest to more clients and since the broadcast delivery network 210 is capable of higher data capacity.

On the other hand, if the BFS server queries the servers coupled to the server access network 206, and no server responds that such data is available, then the BFS server 208 downloads an information response to the client 212 (at the step 510) that the specified data requested by the client 212 is not available. This download of information response is typically through the two-way communications network 402.

In this manner, the two-way broadcast file system 400 of FIG. 4 allows a client to request specified data from the BFS server 208 when that data is not available from the directory index composed by the BFS server 208. This feature may be especially advantageous for sending data that is of interest to only a limited number of clients and only at particular times. Thus, such data is sent via the two-way communications network 402 or for a limited period of time on the broadcast delivery network 210 only upon demand from a client.

Figure 6:
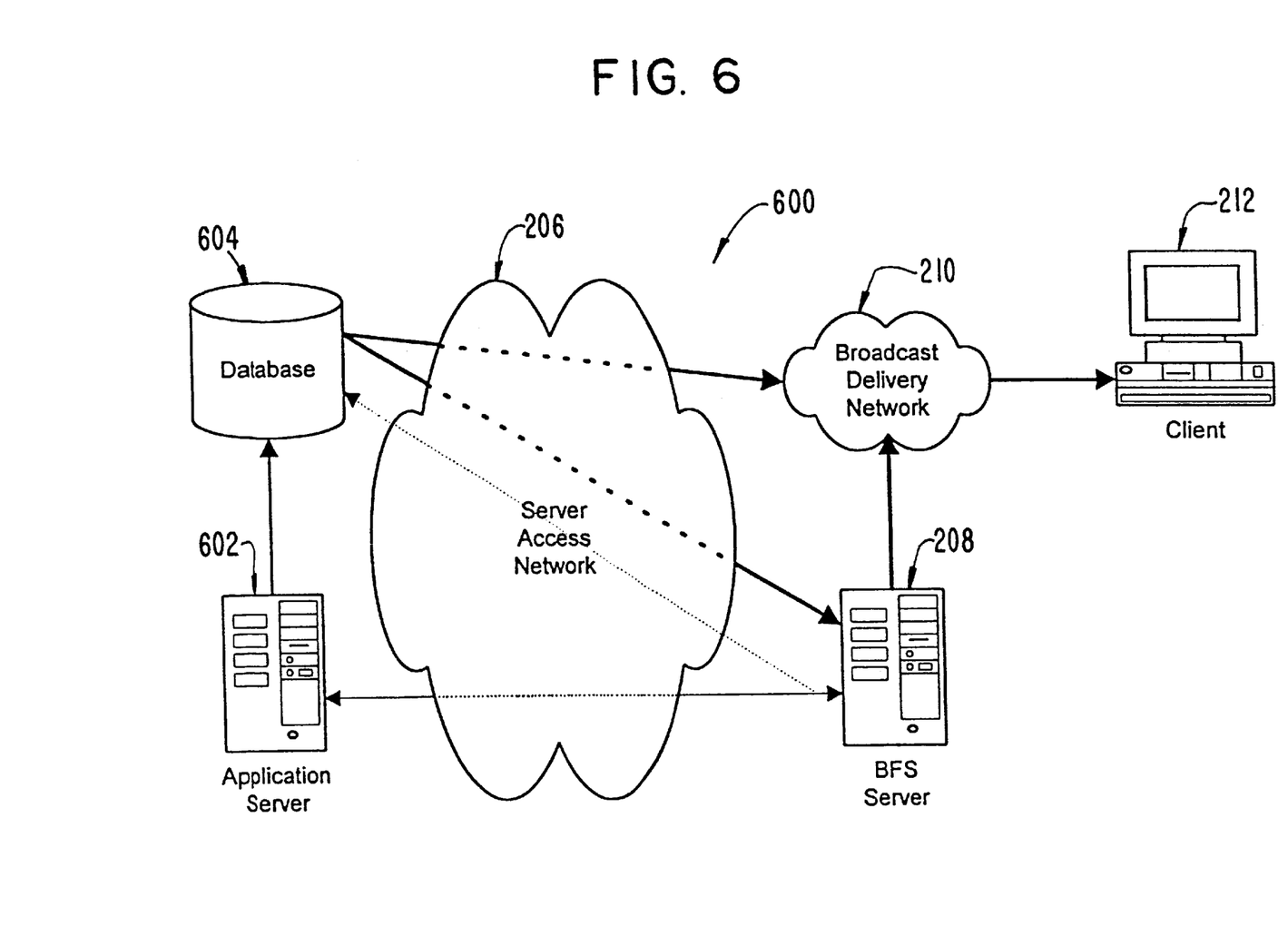
FIG. 6 shows a one-way broadcast database system for communication of data to a client from a server maintaining a database, according to a preferred embodiment of the present invention.

In another embodiment of the present invention, a broadcast database system 600 of FIG. 6 broadcasts data from a database. Referring to FIG. 6, a database server 602 coupled to the server access network 206 manages and maintains a database 604. Data within this database 604 is broadcast to the client 212 in a similar manner to the broadcast file system 200 of FIG. 2.

However, the hierarchial organization of data within the database 602 is according to a database schema, and the directory index includes database schema parameters that reflects this database schema. The top directory for a database directory index may be "\BDB\". Then each database server which wishes to broadcast data from a respective database registers with the BFS server 208 to be assigned a respective directory in the database directory index.

For example, if the database schema of the data in database 604 includes an organization of information about the employees of a company, then the database server 602 may be assigned a directory of "\BDB\personnel". Then, the database server 602 may create subdirectories and tables under the directory "\BDB\personnel". Those subdirectories and tables would also be organized according to a further database schema. For example, subdirectories may be created according to the first letter of the last name of each employee such as "\BDB\personnel\A", "\BDB\personnel\B", and so on to "\BDB\personnel\Z". Then each such subdirectory may include tables of each employee having a last name starting with that respective letter. Entries to this table may include information such as the salary of that employee, the social security number, the tax rate, etc. In this manner, the directory index for a database is organized according to a database schema.

Figure 7:
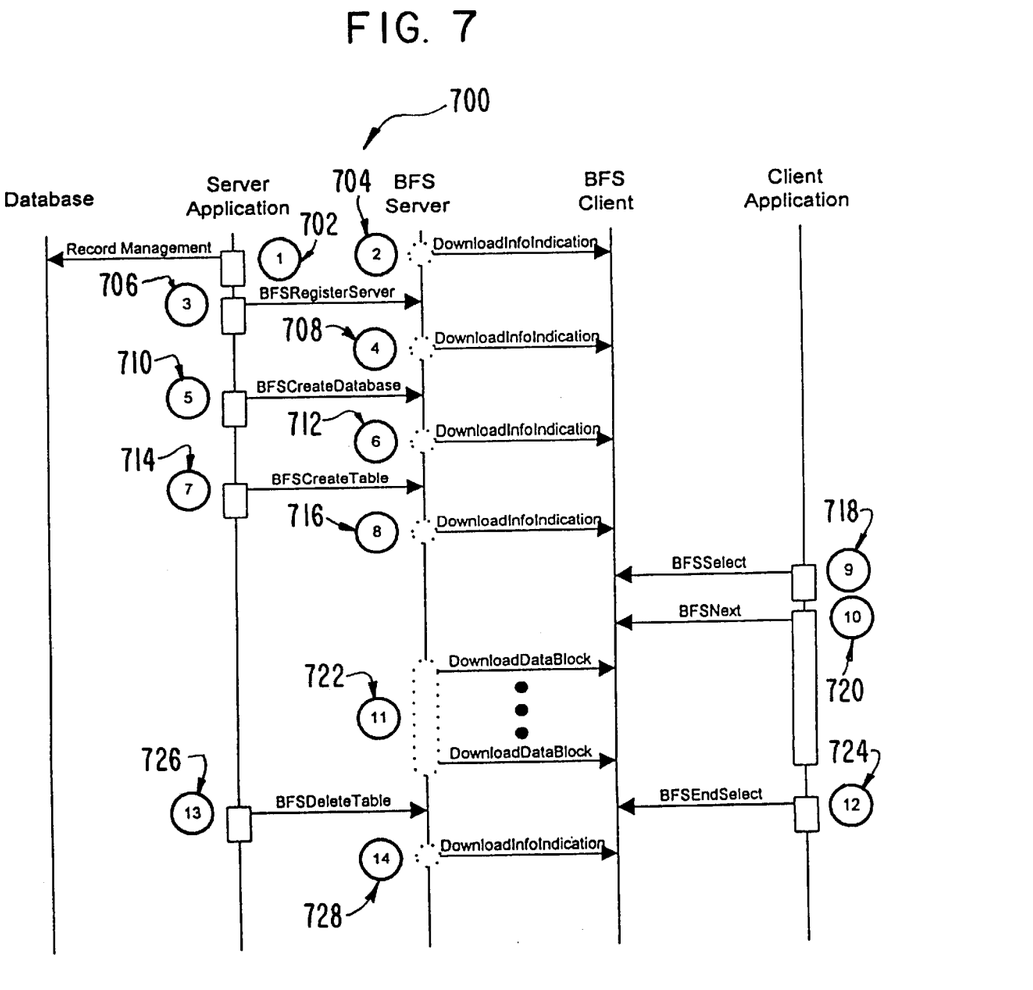
FIG. 7 shows an example time-line of operation of the one-way broadcast database system of FIG. 5, according to a preferred embodiment of the present invention.

The operation of the one-way broadcast database system 600 is described with an example operation time-line 700 of FIG. 7. This operation is similar to the example time-line 300 for the one-way broadcast file system 200 of FIG. 2. However, the directory index composed by the BFS server 208 is according to a database schema, and tables are the data unit of interest to a client.

Step 702 includes the database server 602 maintaining the database 604 for record management. At step 704, the BFS server 208 downloads directory index to the client 212 via the broadcast delivery network 210. This directory index may include channel information where particular data may be transported when the broadcast delivery network 210 includes multiple channels.

When the database server 602 wishes to broadcast data via the broadcast delivery network 210, the database server 602 initially registers with the BFS server 208 at step 706. The BFS server 208 then creates a hierarchical file system with all respective tables available from the database 604 being under a respective directory for the database server 602.

The BFS server 208 starts with a home directory such as "\BDB\", and each database server that has registered with the BFS server 208 is assigned a respective directory in this hierarchical file system. The directory index of this hierarchical file system is organized according to a database schema. For example, if the database 604 includes information about the employees of a company, then the application server 602 may be assigned a directory of "\BDB\personnel".

The BFS server 208 periodically downloads directory index at step 708 from step 704 and by now includes information that the directory "\BDB\personnel" has been added with the registration of the database server 602. The directory server 602 may create subdirectories including further database schema and tables under this respective directory.

The database server 602 creates and maintains the database 604 (step 710) under this respectively assigned directory. Again, the BFS server 208 periodically downloads directory index at step 712 from step 708 and by now includes information that the database server 602 has created a database. Additionally, the database server 602 creates or modifies tables within the database 604 at step 714. Again, the BFS server 208 periodically downloads directory index at step 716 from step 712 and by now includes information of creation of a table at step 714.

The client 212 caches the broadcast directory index upon receipt from the broadcast delivery network 210, and presents the directory index as a hierarchical file system to a client application(which is any application module that needs any portion of data available from the database server 602). In this manner, in the view of the client application, the data available from the database 604 which may be located remotely from the client 212 appears as a hierarchical file system organized according to a database schema.

The client application selects parameters of interest from the database schema at step 718. For the example personnel database schema as described herein, the client application may request data relating to all personnel whose name begins with "A". The selected parameters are sent to the client 212 with a next command at step 720 which puts the client 212 on notice to filter out data matching the selected parameters during broadcast of the database data at step 722. At step 722, the database data is periodically broadcast via the broadcast delivery network 210 and may use a broadcast data carousel mechanism which is defined in the MPEG-2 DSM-CC specification (ISC/IEC 13818-6 IS). When the client application receives sufficient data corresponding to the selected parameters, the client application sends an "endselect" command to the client 212 to end the data request at step 724.

The database servers 602 may, in addition to creating and modifying subdirectories and tables under the respective directory assigned by the BFS server 208, delete subdirectories and tables. For example, after a table has been broadcast, that table may become uncurrent, and in that case, a server may delete that table as indicated at step 726. Once again, the BFS server 208 periodically downloads directory index to the client 212 at step 728 and by now includes information that a table has been deleted at step 726 (i.e., the deleted table is no longer included in the directory index broadcast during the download of directory index at step 728).

In this manner, the one-way broadcast database system 600 of the present invention presents any data available from the database 604 as a hierarchical file system organized according to a database schema as a directory index. That directory index is periodically broadcast to the client receiving broadcast database data. The client caches this directory index and presents this directory index as a hierarchical file system to any client application which may need any portion of data available from the database 604. The client application may select data from the directory index by specifying database parameters, and the client filters the data meeting those database parameters from the data broadcast via the broadcast delivery network 210.

In this manner, the client application which consumes a portion of the data broadcast from a database has minimized processing burdens since the client application does not have to organize data received from the broadcast delivery network 210. The data is already organized into a hierarchical file system according to a database schema before the data is presented to the client application.

Moreover, the directory index is cached, and the underlying tables broadcast via the broadcast delivery network 210 is not cached until the client application requests specified portions of tables from the directory index. Thus, all of the broadcast tables are not cached, and memory resource is conserved with caching a portion of the data that a client application requests.

Figure 8:
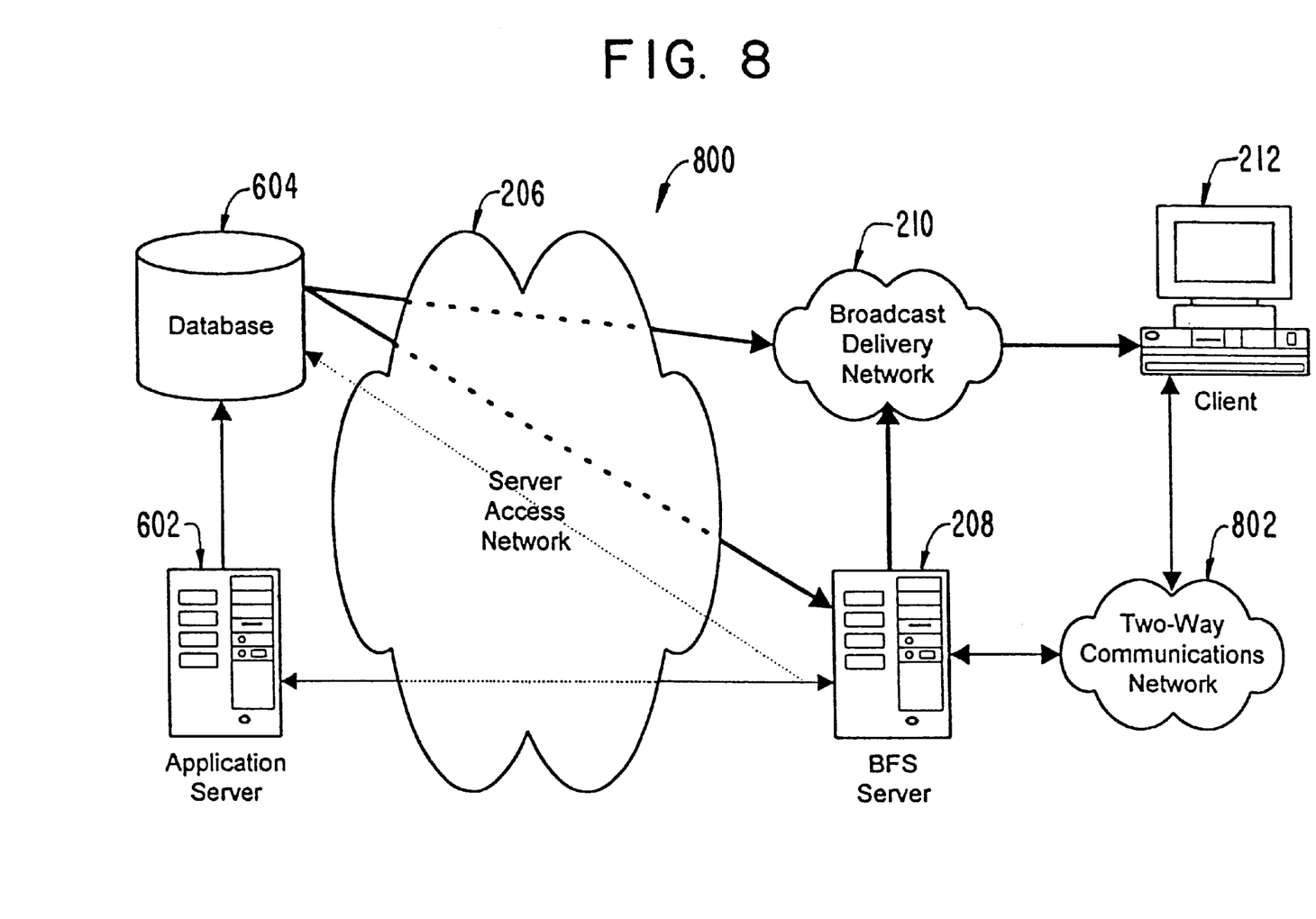
FIG. 8 shows a two-way broadcast database system for communication of data to a client from a server maintaining a database, according to a preferred embodiment of the present invention.

According to another embodiment of the present invention, a two-way broadcast database system 800 of FIG. 8 further includes a two-way communications network 802 coupled between the client 212 and the BFS server 208. Elements having the same reference numeral in FIGS. 6 and 8 refer to the same element. With the two-way communications network 802, the broadcast database system 800 is two-way with the client 212 being able to request specified tables not available from the directory index composed by the BFS server 208.

The operation of the two-way broadcast database system 800 is similar to the operation of the two-way file system 400 of FIG. 4. The client application requests data such as a table not available from the directory index sent by the BFS server 208. The client 212 downloads this information request to the BFS server 208 via the two-way communications network 802. Upon receipt of this information request, the BFS server 208 queries the database server 602 to determine if the database 604 is able to provide the specified data requested by the client 212. If the specified data is available, the BFS server 208 downloads an information response that the specified data is available via the two-way communications network.

This specified table may then be sent to the client 212 by the BFS server 208 via the two-way communications network 802 in the case only that particular client requesting this table may be interested in receiving this table. Alternatively, the specified file may be incorporated into the directory index composed by the BFS server and may be broadcast for a limited time to all clients coupled to the broadcast delivery network 210. The latter mechanism is more desirable for a table that may be of interest to more clients and since the broadcast delivery network 210 is capable of higher data capacity.

On the other hand, if the BFS server 208 queries the database 604 and the specified table is not available, then the BFS server 208 downloads an information response to the client 212 that the specified table requested by the client 212 is not available. This download of information response is typically through the two-way communications network 802.

In this manner, the two-way broadcast database system 800 of FIG. 8 allows a client to request a specified table from the BFS server 208 when that data is not available from the directory index composed by the BFS server 208. This feature may be especially advantageous for sending a table that is of interest to only a limited number of clients and only at particular times. Thus, such a table is sent via the two-way communications network 802 or the broadcast delivery network 210 for a limited time only upon demand from a client.

An example application which uses the broadcast file system of the present invention is an (EPO) Electronic Programming Guide application. A cable television provider commonly provides an EPG application which includes a listing of television programs which are currently being broadcast or will be broadcast in the near further. The EPG is updated with time for new listings, and the update is reflected with the periodic broadcasting of the EPG.

Typically, a truncated form of information is provided for each program including the name of the program, the start time and perhaps a short description of the program. While such information provides a channel line-up, such information may be insufficient for a TV viewer. An extended program description and a video clip of the program may be further provided to the viewer upon demand. However such extended program descriptions require more memory for storage.

In the prior art EPG system, the EPG application stores all of the data that is received so that the information is available on demand by the viewer. However, extended program descriptions and video clips may require extensive memory for storage. In addition, the video clips are sent in a single channel in an order which is determined by the cable provider, and thus, a subscriber cannot view a specified video of a specified program.

With the broadcast file system of the present invention, the overall channel line-up may be broadcast in a single file which is a relatively small file that is cached so that the EPG application has immediate access to this data when a cable subscriber enters the application. The BFS server 208 would update this file and send the file periodically to ensure that the EPG application has the current program listing.

Since most subscribers are interested in programming for the near future, the plurality of servers 202 and 204 create entries of the expanded program descriptions and video clips for programs in the near-future time frame. This information is organized into a hierarchical file system including a directory index, and is broadcast repeatedly via the broadcast delivery network 210 such that the client 212 does not have to store all of this information until a subscriber requests a specified portion of this information. The EPG application selects a particular file or table from the directory index and requests that file or table from the client 212. The client 212 then collects this specified data from the periodic broadcast of this data.

A subscriber may also be interested in a program which will be available in the distant future. Since not a lot of subscribers would be looking at a specified entry in the distant future at the same time, the broadcast file system does not broadcast such information via the broadcast delivery network 210. The broadcast file system may include a two-way communications network whereby the EPG application may request data for distant-future programs. The BFS server 208 would look for this data from the plurality of servers 202 or 204 or from the database 604. If the data is found, the specified data may be sent to the EPG application of that subscriber via the two-way communications network especially when only that subscriber is interested in this information. Alternatively, the specified data may be repeatedly broadcast for a short period of time over the broadcast delivery network 210 rather than through the relatively low speed two-way communications network.

An example hierarchical file system reflected in the directory index for the EPG application composed by the BFS server 208 for data available from a first server may appear as follows:

---

\BFS\ {Broadcast File System root directory.}
    \GUIDE_FIRST_SERVER {EPG directory for a first server providing program listing data.}
        \CURRENT PROGRAMS {EPG directory for current programs.}
            \current.guide {File containing current channel line-up.}
            \DESCRIPTION {Current program description directory.}
                \program1.dsc {File containing extended description of a first current program.}
                \program2.dsc {File containing extended description of a second current program.}
            \CLIP {Current program clip directory.}
                \program1.clip {File containing video clip of a first current program.}
                \program2.clip {File containing video clip of a second current program.}

---

\FUTURE PROGRAMS {EPG directory for future programs. This directory is empty until a request is sent to the BFS server by a client requesting extended program information available from the first server for a program in the distant future.}

With the broadcast file system of the present invention, extended program description and video clips which may require large memory for storage are not cached by an EPG application from the broadcast data until a subscriber requests a specific portion of such data. The specific requested portion of such data is cached. Thus, memory space is conserved for the EPG application using the broadcast file system of the present invention, while extended program descriptions and video clips are available to a subscriber on demand for both near-future and distant-future programs.

Another example application which may advantageously use the broadcast file system of the present invention is a WWW (World Wide Web) application provided by an Internet access provider. As Internet access has gained in popularity, an increasing number of "web browsers" have been used to "surf the net." The process of "surfing the net" involves an WWW application requesting a web page from an Internet server. This web page usually consists of a combination of text and data objects used by a web browser to construct a display which may be used to display information and/or to collect information. The data required to construct such a web page may be quite large and may require a long time to download to the web browser over the relatively low speed two-way communications network (such as the telephone network).

Using the broadcast file system of the present invention, an Internet server may place a web page for broadcast via the broadcast delivery network 210. If a server determines that particular web pages are popular, as for service provider home pages and search engines, such popular web pages may be continuously broadcast to allow client applications to have direct access to such a page without having to request it from the server via a slow two-way communications network. Such broadcasting further eliminates traffic over the two-way communications network and further speeds up access at the client side.

Referring to the broadcast file system 200 of FIG. 2, the first server 202 may register to provide a first web page and the second server 204 may register to provide a second web page. The first server 202 upon registration with the BFS server 208 may be assigned a first respective directory such as /FIRST_DOTCOM. The second server 204 upon registration with the BFS server 208 may be assigned a second respective directory such as /SECOND_DOTCOM.

A respective html file for creating a respective web page for an Internet server is contained under the respective directory for that server. The html file for the web page of an Internet server may also include hyperlinks to other files which are required to create that web page. In that case, the WWW application would search the directory index broadcast from the BFS server to find those other files. If such a file does not appear in the directory index, such a specified file may be requested via a two-way communications network 402 as described for the two-way broadcast file system 400 of FIG. 4. The BFS server 208 then searches the plurality of Internet servers registered with the BFS server 208 to provide that specified file if the file is available from any of the registered servers as described for the two-way communications file system 400 of FIG. 4.

An example hierarchical file system represented by the BFS directory index for a web browser application may appear as follows:

\BFS {Broadcast file system root directory.}
  \FIRST_DOTCOM {Directory for a first Internet server.}
    \First_Path {Directory path where a first web page file is located}
      \first_webpage.html {html file for the first web page.}
      \Other_Object1.xxx {Another object file which may be required to build the first web page.}
    \Other_Path1 {Directory which may contain other object files which may be required to build the first web page.}
      \Other_Object2.xxx {Another object file which may be required to build the first web page.}
  \SECOND_DOTCOM {Directory for a second Internet server.}
    \Other_Path2 {Directory which may contain other object files which may be required to build the first web page.}
      \Other_Object3.xxx {Another object file which may be required to build the first web page.}

When an Internet access subscriber wishes to access the first web page, the WWW application first requests the file "first_webpage.html" from the client 212 to begin construction of the first web page. This file may include hyperlinks to other objects that are required for creating the web page such as "Other_Object1.xxx" which is located in the same directory "\First_Path." Alternatively, the other objects such as "\Other_Object2.xxx" may be included under a different directory "\Other_Path1" or such as "\Other_Object3.xxx" may be located within another server "\SECOND_DOTCOM." If a file is requested by the WWW application which does not appear in the above directory index, then the client 212 may request the file via a two-way communications link as described for the two-way broadcast file system 400 of FIG. 4.

Figure 9:
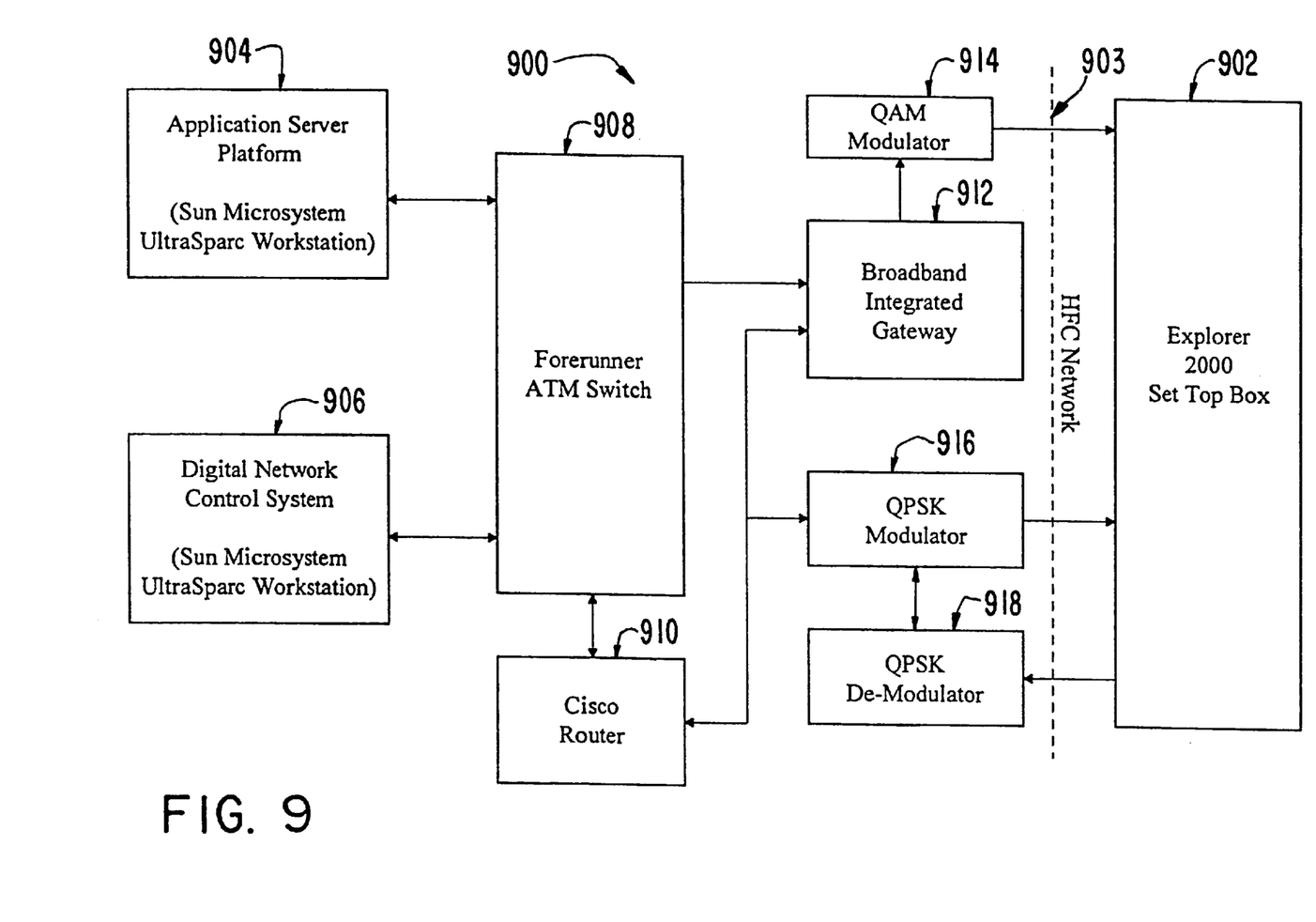
FIG. 9 shows an example detailed implementation of the broadcast file system of the present invention.

Referring to FIG. 9, an example detailed implementation 900 is shown for the broadcast file system of the present invention. Such an implementation is used when the client 212 is an Explorer 2000 set top box 902 for providing cable television services and available from Scientific Atlanta, Inc., in Atlanta, Ga. The example detailed implementation 900 includes components in a "head end" to a HFC (Hybrid Fiber Coaxial) network 903 as is typically used for cable television. The HFC network 903 serves as the broadcast delivery network 210.

The head end to the HFC network 903 includes an application server platform 904 which may be a Sun Microsystems UltraSparc Workstation for any of the application servers 202, 204, or 602. The application server platform 904 is where the server application processes execute. For example, for cable television, such server application processes may include an Interactive Electronic Program Guide and an Impulse Pay-Per-View as is available from Scientific Atlanta, Inc., in Atlanta, Ga.

The head end to the HFC network 903 also includes a digital network control system 906 which also may be a Sun Microsystems UltraSparc Workstation. The BFS server 208 resides within the digital network control system 906 which includes applications for controlling a Forerunner ATM switch 908. The Forerunner ATM Switch 908 is the server access network 206 and interconnects the application server platform 904 and the digital network control system 906. Data traffic via the Forerunner ATM Switch 908 between the application server platform 904 and the digital network control system 906 uses IP protocol encapsulated in ATM.

The Forerunner ATM Switch 908 also couples the application server platform 904 and the digital network control system 906 to the HFC Network 903. A Cisco Router 910 converts the ATM encapsulated IP traffic to Ethernet encapsulated traffic. A Broadband Integrated Gateway 912 converts the ATM encapsulated MPEG to a format which is suitable for delivery to a QAM modulator 914. The QAM modulator 914 converts the output of the Broadway Integrated Gateway 912 with RF modulation at a specific frequency. The format of the output of the QAM modulator 914 is defined by the Digital Audio Video Council (DAVIC) version 1.3 specification. Multiple QAM modulators may be present., and each QAM modulator produces a single RF signal. Such signals from the QAM modulators are synonymous with "television channel" although such signals carry digital data rather than the standard analog television channel. Data from the QAM modulator 914 may be combined with other RF signals for delivery to the set top box 902 over the HFC network 903.

A QPSK modulator 916 receives a MPEG defined data download protocol from the Broadband Integrated Gateway 912 and converts such a protocol according to RF modulation at a specific frequency. The format of the output of the QPSK modulator 916 is also defined by the Digital Audio Video Council (DAVIC) version 1.3 specification. A QPSK modulator produces a single RF signal. This signal carries digital data and is combined with other RF signals for delivery to the set top box 902 via the HFC network 903.

A QPSK demodulator 918 receives data sent from the set top box 902. This data is then routed through the QPSK modulator 916 for delivery back toward the head end. The format of the input to the QPSK demodulator 918 is also defined by the Digital Audio Video Council (DAVIC) version 1.3 specification.

The Explorer 2000 set top box 902 is an example client 212 and is located at the home of a cable television customer. The set top box 902 receives data from the HFC network 903 for further processing. The set top box 902 typically includes two receivers, a QAM receiver which receives in-band data at a high speed and a QPSK receiver which receives out-of-band data at a relatively low speed.

In summary, the Forerunner ATM switch 908, the Cisco Router 910, the Broadband Integrated Gateway 912, the QAM modulator 914, the QPSK Modulator 916, and the QPSK De-Modulator 918 ensure smooth data exchange between the application server platform 904, the digital network control system 906, and the HFC network 903.

In the example detailed implementation 900 as a broadcast file system of the present invention, the directory index created by the BFS server (i.e. the digital network control system 906 of FIG. 9) is periodically broadcast over an out-of-band channel. The directory index is a file which is carried on a DSM-CC (Digital Storage Media-Command and Control) data carousel in accordance with the MPEG-2 DSM-CC specification (ISC/IEC 13818-6 IS). According to this specification, when the set top box 902 initializes, a DSM-CC User-to-Network Configuration procedure is performed.

This procedure configures the set top box 902 with parameters that may be needed for receiving the directory index. For example, the frequency location of the directory index, the DSM-CC Carousel ID and Version Number and the DSM-CC Module ID and Version Number, and the rate at which the directory index is being broadcast via the HFC network 903 is specified to the set top box 902. With this information, the set top box tunes to the frequency location to receive the periodically broadcast directory index.

The directory index created by the BFS server 208 (i.e., the digital network control system 906 of FIG. 9) in addition to providing a hierarchical file system also includes further information regarding each file element available under that hierarchical file system. The DSM-CC Data Carousel is also used to transport the underlying data within that hierarchical file system in accordance with the ISO/IEC 13818-6 specification, chapter 7, entitled "Data Download." This specification defines a method for transporting modules over MPEG-2 private sections or other transport mechanisms.

The general architecture of the directory index contains a top-level carousel known as a default carousel that contains at least one module. This module ID is typically well known and contains the directory index. A new data carousel is then created each time an application server registers with the BFS sever 208 (i.e., the digital network control system 906 of FIG. 9). The respective frequency location and carousel ID of each such carousel is contained within the directory index. When an application server creates a directory, such modification is updated in the directory index. As data files are added by an application server, the BFS server 208 (i.e., the digital network control system 906 of FIG. 9) creates a respective module ID for each such file to be broadcast via the HFC network 903, and this module ID is also included within the directory index.

The following data format defines the directory index broadcast within the default data carousel:

```
BFS_Directory(
    Protocol_Identifier
    BFS_Version
    Element_Count
    for (I=0; I<Element_Count; I++)
    {
        BFS_Element( )
    }
)
```

The Protocol_Identifier field indicates the data format and protocol currently being used for the directory index. Such data format and protocol may be modified as new formats and protocols as known to one of ordinary skill in the art evolve. The BFS_Version field is incremented each time a modification to the directory index has been made which may include adding, modifying, or deleting any element within the directory index. The Element_Count field indicates the total number of elements that are included in the directory index.

A list of the BFS elements (which may include directories and files) as indicated by the BFS_Element field define the hierarchical file system. Each BFS_Element structure may include the following data format:

```
BFS_Element(
    Element_ID
    Link_ID
    Element_Type
    Element_Mode
    Element_Length
    Carousel_Source_ID
    Carousel_ID
    Carousel_Version
    Module_ID
    Module_Version
)
```

Element_ID is a unique identifier for a particular BFS element. The BFS Server 208 (i.e., the digital network control system 906 of FIG. 9) assigns a respective Element_ID for each BFS element. The Link_ID identifies the parent of this BFS element in the hierarchical file system. The Element_Type identifies the type of BFS element such as a directory or a file. The Element_Mode identifies the type of operations that are permitted on this BFS element such are reading a file or writing a file to a directory by the client 212. The Element_ID, the Link_ID, the Element_Type, and the Element_Mode fields may be used by the client 212 (i.e., the set top box 902 in FIG. 9) to create the hierarchical file system for a client application.

The next BFS element fields indicate to the set top box 902 where and how to find that BFS element as the BFS elements are periodically broadcast via the HFC Network 903 in accordance with the MPEG-2 DSM-CC specification (ISC/IEC 13818-6 IS). The Carousel_Source_ID identifies the carousel carrying that BFS element including tuning information and the MPEG program number of that carousel. The Carousel_ID identifies that particular carousel in a source identified for that carousel. The Carousel_Version identifies the current version of the carousel which is being broadcast. This version is incremented any time a module being carried in that carousel is added, modified, or deleted. The BFS client (i.e., the set top box 902 in FIG. 9) may look at this field to determine if any of the files in a carousel have been modified.

The Module_ID identifies the module in the carousel that is used to transport a file. This field has meaning when the Element_Type is a file. The Module_Version identifies the current version of the module that is being broadcast. This version is incremented any time the module is modified. The BFS client (i.e., the set top box 902 in FIG. 9) may look at this field to determine if a specific file has been modified.

In this manner, the directory index that is periodically broadcast by the digital network control system 906 via the HFC network 903 contains data from which the set top box 902 may construct a hierarchical file system of the BFS elements available to the set top box 902. Paths for BFS elements appear in a hierarchical manner such that the hierarchical file system is built from the root down. Thus, a path identifier typically does not contain a parent reference to a path identifier that occurs down the path in the hierarchical file system. Furthermore, the directory index that is periodically broadcast further includes carousel and module information for each BFS element such that the set top box 902 may determine the frequency location and the timing for receiving any desired BFS element in accordance with the MPEG-2 DSM-CC specification (ISC/IEC 13818-6 IS).

Any patents or documents referenced above are hereby incorporated by reference.

The foregoing example applications and example implementation for the broadcast file system of the present invention are by way of example only and is not intended to be limiting. In addition, the advantageous features of the present invention may be used in conjunction with any number of servers and clients. Moreover, the data broadcast on the broadcast delivery network 110 may be broadcast directly from a server or by the BFS server on behalf of a server. In addition, the present invention may be used with any other advantageous features for the broadcast file system such as including links to files within a server such that the BFS server is not required to store all available data from the servers. The invention is limited only as defined in the following claims and equivalents thereof.

We claim:

1. A method for delivering data from a plurality of servers to a client by broadcasting said data via a broadcast delivery network, said method including the steps of:

A. organizing said data into a hierarchical file system having a directory index, wherein each of the plurality of servers registers to send respective data under a respective directory within said directory index;

B. periodically broadcasting said directory index to said client via said broadcast delivery network, wherein said client caches and provides said directory index to a client application such that said data available from said plurality of servers appears as a hierarchical file system of a computer operating system; and C. periodically broadcasting said data to said client via said broadcast delivery network such that portion of said data requested by said client application from said directory index is available to said client application;

and wherein said client requests specified data not available from said directory index, via a two-way communications network, and wherein said method further includes the steps of:

sending the specified data to said client via one of said two-way communications network and said broadcast delivery network if said specified data is available from any of said plurality of servers; and notifying said client via said two-way communications network that said specified data is not available if said specified data is not available from any of the plurality of servers;

and wherein a database server of said plurality of servers maintains a database, wherein said respective data available from said database server includes tables from said database, and wherein said respective directory of said database server, within the directory index, indexes said tables according to a database schema, and wherein said client application specifies database schema parameters from said directory index when accessing data available from said database server, and wherein said client requests specified data not available in said directory index, from said database server via a two-way communications network.

2. A broadcast file system for delivering data from a plurality of servers to a client, said broadcast file system comprising:

a broadcast delivery network, operatively coupled to the client, for broadcasting said data to said client;

a broadcast file system server, operatively coupled to said broadcast data network and said plurality of servers, for organizing said data into a hierarchical file system having a directory index, wherein each of the plurality of servers registers to send respective data under a respective directory within said directory index; and a server access network for coupling the plurality of servers to the broadcast file system server, wherein the broadcast file system server periodically broadcasts said directory index to said client via said broadcast delivery network, wherein said client caches and provides said directory index to a client application such that said data available from said plurality of servers appears to said client application as a hierarchical file system of a computer operating system, and wherein the broadcast file system server periodically broadcasts said data to said client via said broadcast delivery network such that portion of said data requested by said client application from said directory index is available to said client application.

3. The broadcast file system of claim 2, further comprising:

a two-way communications network, operatively coupled between said client and said broadcast file system server, said client requesting specified data not available from said directory index via the two-way communications network.

4. The broadcast file system of claim 3, wherein said broadcast file system server sends said specified data to said client via said two-way communications network if said specified data is available from any of said plurality of servers.

5. The broadcast file system of claim 3, wherein said broadcast file system server incorporates said specified data requested by said client into said hierarchical file system and broadcasts said specified data via said broadcast delivery network if said specified data is available from any of said plurality of servers.

6. The broadcast file system of claim 3, wherein said broadcast file system server notifies said client via said two-way communications network that said specified data is not available if said specified data is not available from any of the plurality of servers.

7. The broadcast file system of claim 2, further comprising:

a database operatively coupled to a database server of said plurality of servers, wherein said respective data available from said database server includes tables from said database, and wherein said respective directory of said database server, within the directory index, indexes said tables according to a database schema.

8. The broadcast file system of claim 7, wherein said client application specifies database schema parameters from said directory index when accessing data available from said database server.

9. The broadcast file system of claim 7, wherein said client requests specified data not available in said directory index, from said database server via a two-way communications network.

10. The broadcast file system of claim 2, wherein said directory index and said data available from said plurality of servers is broadcast via said broadcast delivery network on a broadcast data carousel mechanism.

* * * * *

UNITED STATES PATENT AND TRADEMARK OFFICE
CERTIFICATE OF CORRECTION

PATENT NO. : 6,405,239 B1
DATED : June 11, 2002
INVENTOR(S) : Addington et al.

It is certified that error appears in the above-identified patent and that said Letters Patent is hereby corrected as shown below:

Column 5,
Line 34, delete "nemory" and insert therefore -- memory --

Column 9,
Line 29, delete "(EPO)" and insert therefore -- (EPG) --
Line 33, delete "further." and insert therefor -- future. --
Line 38, insert a comma between "time" and "and"

Column 13,
Line 8, delete "present.," and insert therefor -- present, --

Signed and Sealed this

Twenty-second Day of October, 2002

Attest:

JAMES E. ROGAN
Attesting Officer
Director of the United States Patent and Trademark Office